Nov. 10, 1959  E. J. PETRICK  2,912,202
LOCKING MECHANISM FOR AN ADJUSTABLE STAND
Filed Jan. 15, 1957
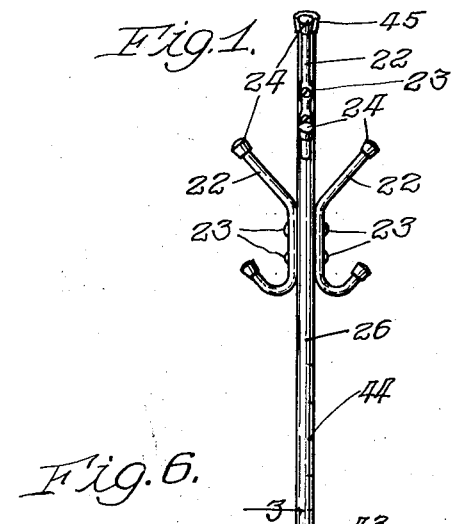
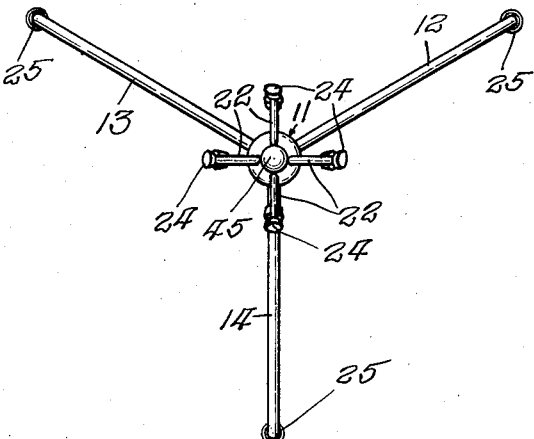
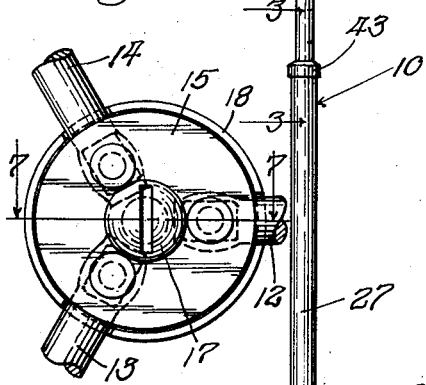
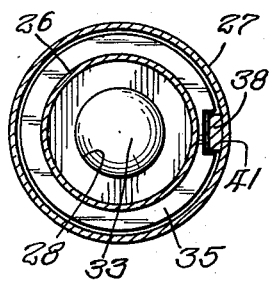
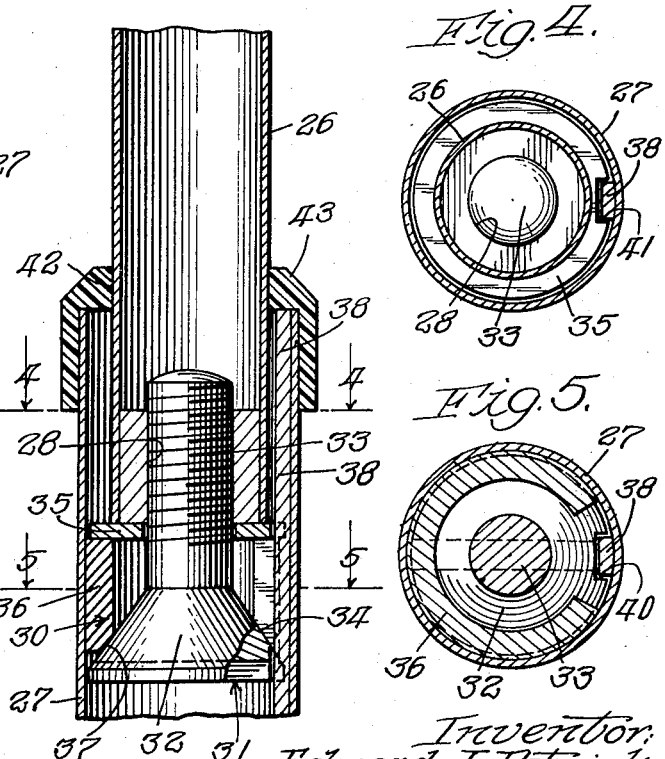
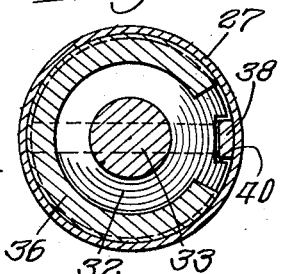
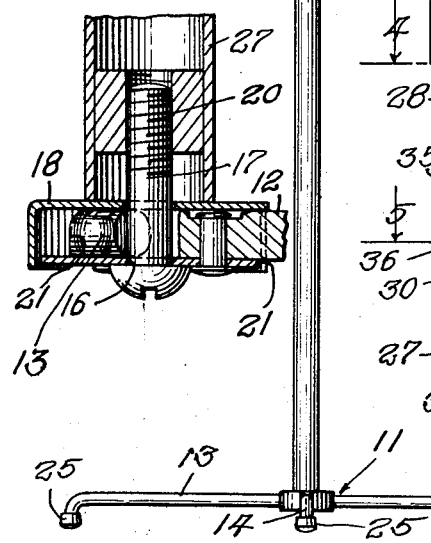
Inventor:
Edward J. Petrick

United States Patent Office 2,912,202
Patented Nov. 10, 1959

2,912,202

LOCKING MECHANISM FOR AN ADJUSTABLE STAND

Edward J. Petrick, Park Ridge, Ill., assignor to Bretford Manufacturing, Inc., Franklin Park, Ill., a corporation of Illinois Application January 15, 1957, Serial No. 634,300

7 Claims. (Cl. 248—161)

This invention relates to a telescoping rod assembly, and more particularly to a locking device for such an assembly.

The primary object of the present invention is to provide a new and improved telescoping rod assembly.

Another object is to provide an improved locking mechanism for retaining such an assembly in the desired degree of extension.

A further object is to provide an internal locking mechanism for an adjustable rod assembly, the locking being effected by providing a friction element adapted to be moved into frictional gripping engagement with the inner surface of a rod member by a relatively movable member mounted in the rod assembly.

Still another object is to provide a locking device having an expandable friction element which has no rotating members bearing against it.

Another object is to provide an internally mounted bolt having a camming surface which cooperates with a split ring of resilient friction material to effect internal locking in a telescoping rod assembly.

The invention is illustrated in a preferred embodiment in the accompanying drawings, in which:

Fig. 1 is a side-elevational view of a telescoping stand from which wearing apparel may be suspended;

Fig. 2, a top-plan view of the stand of Fig. 1;

Fig. 3, an enlarged fragmentary sectional view taken as indicated on line 3—3 of Fig. 1;

Fig. 4, a sectional view taken as indicated on line 4—4 of Fig. 3;

Fig. 5, a sectional view taken as indicated on line 5—5 of Fig. 3.

Fig. 6, a bottom plan view of the base in part.

Fig. 7, an enlarged fragmentary sectional view of the base and rod connection.

In the embodiment illustrated, an extensible rod assembly, generally designated 10, is maintained in upright position upon a base member, generally designated 11, composed of three leg members 12, 13 and 14, each pivotally secured to a base plate 15 at the lower end of the rod assembly 10. The base plate 15 is preferably apertured, as at 16, and is secured to the lower end of the rod assembly by a threaded machine bolt 17 which impales a cap member 18 and is threadably received in a recess 20 in the lower end of the rod assembly 10. The cap member 18 is provided with spaced peripheral cut-out portions 21 which are of a size to respectively receive each of the leg members 12, 13 and 14 and hold them in proper spaced-apart relationship, as shown in Fig. 2.

The upper end of the rod assembly 10 may be provided with four clothing hooks 22 which are secured in place by a number of cap screws 23. The end portions of each of the clothing hooks 22 and the ends of each of the leg members 12, 13 and 14 are preferably provided with decorative plastic caps 24 and 25, respectively.

As shown in Fig. 1, the rod assembly 10 preferably includes a pair of elongated tubular rod members 26 and 27 which are arranged to telescope one within the other.

As best seen in Fig. 3, the telescoping end of rod member 26 is provided with a threaded opening 28.

In order to permit the rod members to be positioned at varying degrees of extension, an internal locking device, generally designated 30, is provided near the end of rod member 26.

The locking device 30 preferably includes a locking bolt, generally designated 31, which is provided with a head portion 32 of a size to make a close sliding fit with the inner surface of the rod member 27, and a threaded shank 33 adapted to be threadably received in the opening 28 of the rod member 26.

The head portion 32 is preferably tapered toward the shank 33 to form a camming surface 34. A washer 35 may be provided at the telescoping end of the rod member 26 to afford an abutting surface for a friction element or sleeve 36 of tough, resilient, friction material which embraces the shank 33 of the bolt 31. The friction element 36 may be provided with an annular beveled surface 37 against which the camming surface 34 may bear.

Preferably the surfaces against which opposite ends of the friction element 36 abut are held against rotation to prevent undue wear upon the element 36. To this end, and as best seen in Figs. 4 and 5, both the bolt 31 and the washer 35 are held against turning with respect to the rod member 27 by a longitudinally extending rib 38 secured to the inner surface of the rod 27, the rib being of a size to be snugly received at spaced points in a pair of notches 40 and 41 in the bolt and washer, respectively.

It is thus apparent that axial rotation of the rod member 26 in a clockwise direction will threadably advance the shank 33 of the bolt 31 into the opening 28, the bolt head 32 and washer 35 being held against rotation relative to the rod member 27 by the rib 38. On the other hand, axial rotation in the opposite direction will cause the bolt 31 to move outwardly of the opening 28 and increase the intervening space between the bolt head and the telescoping end of the rod member 26.

The peripheral surfaces of the head portion 32 and of the washer 35, and an inner annular surface 42 of a decorative cap 43 which encloses the top of the rod member 27 function to stabilize the rod member 26 during its telescoping movement within the rod member 27.

In operation, the rod member 26 is first rotated counter-clockwise to release the locking device 30 and then is moved to the desired position of extension with respect to the rod member 27. Rod member 26 is then axially rotated in a clockwise direction to advance the bolt head 32 against the friction element 36, the camming surface 34 on the head 32 urging the element 36 outwardly into frictional holding engagement with the inner surface of the rod member 27. The rod assembly 10 is then in locked position with the friction element 36 squeezed outwardly between the bolt head 32 and the washer 35. To vary the degree of extension, it is only necessary to axially turn the rod member 26 counterclock-wise to relieve the internal braking pressure and reposition the rod member as desired.

Another feature of the structure involves a scale 44 which is imprinted in inches upon the rod member 26. The scale reads in ascending numerals from the upper free end of the rod member 26 downwardly. The scale is arranged so that the upper edge of the plastic cap 43 serves as an index, and the numerical reading at the cap 43 records the distance in inches from a cap 45 at the top of rod member 26 to the member upon which the stand is supported. Thus it is only necessary to lay a straight edge across the cap 45 and the upper ends of the two uppermost clothing hooks 22 to form an extremely convenient manner of measuring the height of a child.

The foregoing detailed description is given for clearness of understanding only and no unnecessary limitations should be understood therefrom, for some modifications will be obvious to those skilled in the art.

I claim:

1. An extensible rod assembly, comprising: a pair of elongated rod members, one of said rod members being tubular to permit an end of the other rod member to be telescoped therewith, said end having a threaded opening; a bolt having a head and a threaded shank, said shank being threadably received in the opening of said other rod member, the head being slidably disposed in the one rod member and having a portion formed to abut a longitudinally extending portion of said one rod member so as to prevent relative axial rotation between said head and said one rod member whereby axial rotation of the other rod member will advance the head of the bolt toward the end of the other rod member; and a friction element embracing said shank and having its opposite ends bearing between the head of the bolt and said end of the other rod member, said friction element being expansible at its periphery whereby rotation of said other rod member advances the head of the bolt against the friction element to expand said element outwardly into frictional engagement with the inner surface of said one rod member to maintain the rod assembly in the desired degree of extension.

2. An extensible rod assembly as specified in claim 1, wherein said friction element is a longitudinally split ring of resilient material.

3. An extensible rod assembly as specified in claim 1, wherein said friction element is a split ring of resilient material, and the bolt is provided with a camming surface tapered inwardly from the head toward the shank so that said camming surface expands said split ring into frictional holding engagement with the one rod member when the bolt head is advanced toward the end of the other rod member.

4. An extensible rod assembly as specified in claim 1, in which the bolt head is provided with a notch and the one rod member has a fixed longitudinally extending rib of a size to snugly slidingly fit in said notch and hold said bolt against turning with respect to said one rod member.

5. An extensible rod assembly as specified in claim 4, in which a washer is provided between said friction element and the one end of the other rod member to provide an abutting surface for the friction element, said washer having a notch of a size to slidingly receive the rib of the one rod member so that both the washer and the bolt are held against turning with respect to the one rod member when the bolt is advanced to bring the friction element into frictional holding engagement with the inner surface of said one rod member.

6. A telescoping stand, comprising: a pair of elongated rod members, one of said rod members being tubular to permit an end of the other rod member to be telescoped therewith, said end having an axially extending threaded opening; a base for holding said rod members in upright position; a bolt having a threaded shank and a head tapered inwardly toward the shank to form a camming surface, said shank being threadably received in the opening of the other rod member, the head of said bolt having a portion formed for mating sliding engagement with a longitudinally extending portion of said one rod member so that the bolt is held against axial rotary movement with respect to said one rod member and axial rotation of said other rod member will advance the head of the bolt toward the end of the other rod member; and a friction element embracing said shank and having its opposite ends bearing between the head of the bolt and said end of the other rod member, said element being resiliently expandable whereby rotation of said rod member advances the head of the bolt and camming surface to expand said element outwardly into frictional gripping engagement with the inner surface of said one rod member to maintain the pair of rod members in the desired degree of extension.

7. A telescoping stand as specified in claim 6, in which a washer is provided about the shank between the friction element and the one end of the other rod member, and the one rod member is provided with a longitudinally extending rib, said friction element being a split ring of resilient friction material, and the bolt head and washer each being notched to snugly slidingly receive the rib and prevent the washer and bolt from turning with respect to the one rod member as the bolt is being advanced.

References Cited in the file of this patent

UNITED STATES PATENTS

| | | |
|---|---|---|
| 1,830,223 | Bushnell | Nov. 3, 1931 |
| 2,291,748 | Neuwirth | Aug. 4, 1942 |
| 2,542,967 | Waechter | Feb. 20, 1951 |